United States Patent
Coleman et al.

(10) Patent No.: US 9,195,564 B2
(45) Date of Patent: Nov. 24, 2015

(54) ADVANCED NOTIFICATION OF WORKLOAD

(75) Inventors: Michael J. Coleman, Hursley (GB); Matthew D. Whitbourne, Horndean (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 322 days.

(21) Appl. No.: 13/602,438

(22) Filed: Sep. 4, 2012

(65) Prior Publication Data

US 2014/0068052 A1 Mar. 6, 2014

(51) Int. Cl.
*G06F 11/34* (2006.01)
*H04L 12/911* (2013.01)

(52) U.S. Cl.
CPC .......... *G06F 11/3495* (2013.01); *H04L 47/82* (2013.01); *G06F 2201/875* (2013.01)

(58) Field of Classification Search
None
See application file for complete search history.

(56) References Cited

U.S. PATENT DOCUMENTS

| | | | |
|---|---|---|---|
| 6,715,084 B2 | 3/2004 | Aaron et al. | |
| 7,386,611 B2 | 6/2008 | Dias et al. | |
| 7,953,843 B2 | 5/2011 | Cherkasova | |
| 8,145,731 B2 | 3/2012 | Cherkasova et al. | |
| 2005/0021731 A1 | 1/2005 | Sehm et al. | |
| 2006/0259690 A1* | 11/2006 | Vittal et al. | 711/118 |
| 2008/0271039 A1 | 10/2008 | Rolia et al. | |
| 2009/0172167 A1* | 7/2009 | Drai et al. | 709/226 |
| 2009/0215541 A1 | 8/2009 | Liu et al. | |
| 2009/0292680 A1* | 11/2009 | Sabnani | 707/3 |
| 2011/0066930 A1* | 3/2011 | Rowe et al. | 715/205 |
| 2011/0314142 A1 | 12/2011 | Newton | |
| 2012/0144038 A1* | 6/2012 | Hildebrand | 709/226 |

OTHER PUBLICATIONS

"Real Time Traffic Alerts," [online] Go Squared Ltd. 2012 [retrieved Feb. 6, 2012] retrieved from the Internet: <http://www.gosquared.com/support/wiki/traffic-alerts>, 3 pgs.
Sisodia, D.S. et al., "Application of Weblogs to Construct Smart Web Servers to Handle User Traffic Efficiently," [online] Int'l. Journal of Advanced Computer Engineering and Architecture, vol. 1, No. 1, Jun. 2011, pp. 141-152, retrieved from the Internet: <http://www.journalshub.com/mrp-admin/journal/pdf/15ijace.pdf>, 12 pgs.
Ratkiewicz, J. et al., "Traffic in Social Media II: Modeling Bursty Popularity," [online] In Proc. of the Int'l. Sym. on Social Intelligence and Networking (SIN-10), IEEE Aug. 20-22, 2010, retrieved from the Internet: <www.cs.indiana.edu/~jpr/traffic_in_social_media_II.pdf>, 8 pgs.

* cited by examiner

*Primary Examiner* — Nicholas Taylor
*Assistant Examiner* — Clayton R Williams
(74) *Attorney, Agent, or Firm* — Cuenot, Forsythe & Kim, LLC

(57) ABSTRACT

Providing advanced notification of workload. A reference to a second website provided to a first website for posting by the first website can be identified. Information associated with the first website can be analyzed to determine whether the reference to the second website will cause an increase in workload to the second website. Responsive to determining the reference to the second website will cause the increase in workload to the second website, an alert can be communicated to the second website or an entity that manages the second website, the alert indicating that the increase in workload to the second website will occur.

18 Claims, 3 Drawing Sheets

300

┌─────────────────────────────┐
│ Identify a reference to a second │
│ website provided to a first website │
│ for posting by the first website │
│ 302 │
└─────────────────────────────┘
              │
              ▼
┌─────────────────────────────┐
│ Analyze, via a processor, │
│ information associated with the first │
│ website to determine whether the │
│ reference to the second website will │
│ cause an increase in workload to the │
│ second website │
│ 304 │
└─────────────────────────────┘
              │
              ▼
┌─────────────────────────────┐
│ Responsive to determining the │
│ reference to the second website will │
│ cause the increase in workload to │
│ the second website, communicate an │
│ alert to the second website or an │
│ entity that manages the second │
│ website, the alert indicating that the │
│ increase in workload to the second │
│ website will occur │
│ 306 │
└─────────────────────────────┘
              │
              ▼
┌─────────────────────────────┐
│ Post in the first website the │
│ reference to the second website after │
│ a particular time delay has expired │
│ since the alert is communicated to │
│ the second website or the entity that │
│ manages the second website │
│ 308 │
└─────────────────────────────┘

FIG. 3

ADVANCED NOTIFICATION OF WORKLOAD

BACKGROUND

Web servers are widely used to host websites accessible to clients via the Internet. The primary function of a web server is to deliver requested web pages to clients using Hypertext Transfer Protocol (HTTP). In a typical scenario, a client sends an HTTP requests to the web server. The web server then sends to a response to the client that includes the requested web page. The web page typically is delivered using an HTML document and any additional content that may be included with a document, such as images, style sheets and scripts.

BRIEF SUMMARY

One or more embodiments disclosed within this specification relate to providing advanced notification of workload.

An embodiment can include a method of providing advanced notification of workload. The method can include identifying a reference to a second website provided to a first website for posting by the first website, analyzing, via a processor, information associated with the first website to determine whether the reference to the second website will cause an increase in workload to the second website, and responsive to determining the reference to the second website will cause the increase in workload to the second website, communicating an alert to the second website or an entity that manages the second website, the alert indicating that the increase in workload to the second website will occur.

Another embodiment can include a system having a processor. The processor can be configured to initiate executable operations including identifying a reference to a second website provided to a first website for posting by the first website, analyzing information associated with the first website to determine whether the reference to the second website will cause an increase in workload to the second website, and responsive to determining the reference to the second website will cause the increase in workload to the second website, communicating an alert to the second website or an entity that manages the second website, the alert indicating that the increase in workload to the second website will occur.

Another embodiment can include a computer program product for providing advanced notification of workload. The computer program product can include a computer-readable storage medium having stored thereon program code that, when executed, configures a processor to perform operations including identifying a reference to a second website provided to a first website for posting by the first website, analyzing information associated with the first website to determine whether the reference to the second website will cause an increase in workload to the second website, and responsive to determining the reference to the second website will cause the increase in workload to the second website, communicating an alert to the second website or an entity that manages the second website, the alert indicating that the increase in workload to the second website will occur.

BRIEF DESCRIPTION OF THE SEVERAL VIEWS OF THE DRAWINGS

FIG. 3 is a flow chart illustrating a method of providing advanced notification of workload in accordance with another embodiment disclosed within this specification.

DETAILED DESCRIPTION

Figure 1:
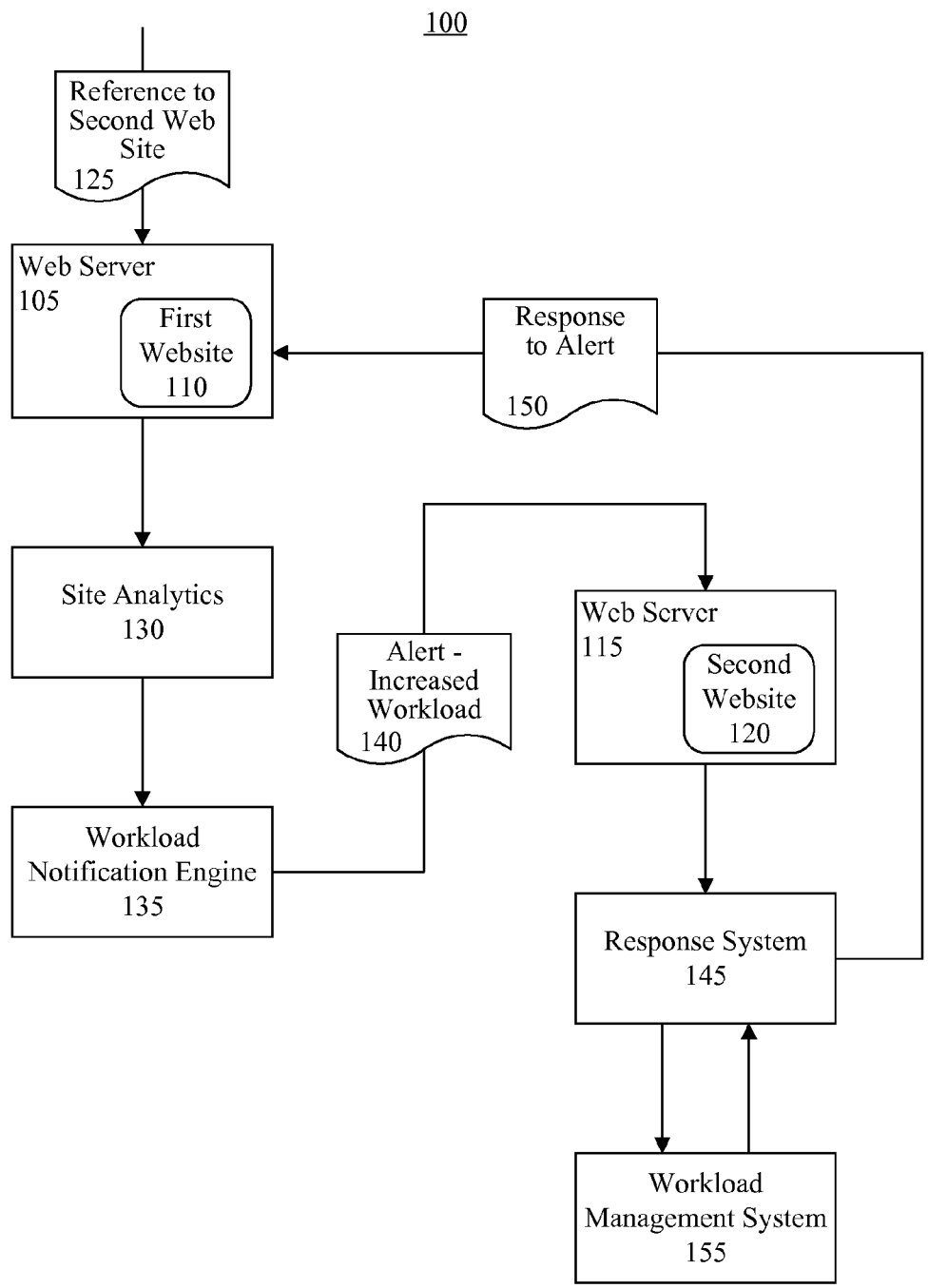
FIG. 1 is a block diagram illustrating an example of a system for providing advanced notification of workload in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

In accordance with the arrangements described herein, advanced notification of an anticipated change in system workload is provided to a processing system to provide an opportunity for the processing system to adjust for the workload. The advanced notification can be provided by another processing system which recognizes a condition that indicates the workload likely will change. The workload can, for example, be related to increased network traffic, though the present arrangements are not limited in this regard.

By way of example, if a link to a particular website is posted on a social networking site in a popular forum, a large number of users may select the link to access the website, and the web server hosting the website may become inundated with HTTP requests. If no steps are taken to adjust for the increased workload, the web server may become overloaded, and thus not able to respond to all of the HTTP requests. The social networking site, however, can identify that the link has been posted in a popular forum, and send to the web server, or an entity responsible for maintaining the web server, a message indicating that the web server may experience increased web traffic, and thus increased workload.

By receiving advanced notification of the workload increase, the web server can be configured to handle the increased workload. For example, certain processes executing on the web server, certain websites hosted by the web server, or a portion of web traffic to the web server, can be transferred to another web server. Further, additional resources can be allocated to the web server to aid the web server in handling the increased web traffic. For instance, the web server can be assigned additional processing resources (e.g., processor cores), additional memory (e.g., RAM), additional storage capacity, etc. If the web server is maintained in a cloud computing environment, the additional resources can be dynamically assigned to the web server.

FIG. 1 is a block diagram illustrating an example of a system 100 for providing advanced notification of workload in accordance with one embodiment disclosed within this specification. The system 100 can include a web server 105 hosting first website 110 and a web server 115 hosting a second website 120. The web server 105 is communicatively linked to the web server 115 via one or more suitable communication networks, for example the Internet, one or more WANs, one or more LANs, and/or the like. In one arrangement, the first website 110 can be host a social networking site, although the present arrangements are not limited in this regard.

In operation, the first website 110 can receive a reference 125 to the second website 120 for posting by the first website 110. The reference 125 can be, for example, a uniform resource identifier (URI) (e.g., a uniform resource locator (URL)) identifying a webpage of the second website 120. In one arrangement, the reference 125 can be contained in information a user submits to the first website 110 to be posted in a forum hosted by the first website 110, for example as a post in a chat room, a thread or a user space provided by the first website 110.

In response to receiving the reference 125, the first website 110 can identify the reference 125 and initiate execution of site analytics 130 to determine whether the reference 125 to the second website 120 will cause an increase in workload, for example network traffic, to the second website 120. For example, if the reference 125 is submitted to be posted in a forum that is very popular among users of the first website 110, the site analytics 130 may determine that that the reference 125 will cause an increase in workload to the second website 120. The site analytics 130 also may consider other factors in reaching the determination. For instance, the site analytics 130 can identify user activity in the forum, history of how frequently posted URIs are selected by users of the form, etc., and process such information to arrive at the determination. In illustration, the site analytics 130 can compare any such data to one or more threshold values to arrive at the determination. In this regard, if the second website 120 is known to the web server 105, a threshold value can be associated with the second website 120 and used for the comparison. One or more other threshold values can be established for websites unknown to the web server 105.

Further, the site analytics 130 can identify the domain with which the second website 120 is associated, and based on the domain, determine whether the web server 115 likely is capable of handling increased workload that may be generated by users selecting the reference 125 to the second website 120. For example, if the reference 125 provides a URI to a domain known to be configured to handle a high amount of workload, the site analytics 130 can determine that the second website 120 likely is capable of handling any workload generated by users of the first website 110 selecting a hyperlink provided by the reference 125. If, however, the reference 125 provides a URI to a domain unknown to the first website 110, or to a domain known to be unsuitable for handling a high amount of workload, the site analytics 130 can determine that the second website 120 likely is not presently capable of handling workload generated by users of the first website 110 selecting a hyperlink provided by the reference 125.

In response to the site analytics 130 determining the reference 125 to the second website 120 will cause the increase in workload to the second website, and/or the second website 120 is not known to be able to handle the increase in workload, a workload notification engine 135 can generate an alert 140 indicating that the increase in workload to the second website 120 will occur. The alert 140 can be communicated to the second website 120 or an entity that manages the second website 120. Such entity can be the web server 115, another system that manages the web server 115, or one or more persons tasked with managing the second website 120.

The reference 125 can be posted in the first website 110 when the reference 125 is received, after the alert 140 is sent, or after a particular time delay has expired. The time delay can be a default time delay, a time delay selected based on the domain associated with the reference, a time delay specified by the user who provided the reference 125 to the first website 110, or a time delay since the alert 140 is communicated to the second website 120 or the entity that manages the second website 120.

In another arrangement, the time delay can be specified by the second website 120 or the entity that manages the second website 120. For example, pursuant to receiving the alert 140, the web server 115 (or second website 120) can initiate a response system 145. The response system 145 can provide a response 150 to the alert 140 that identifies the time delay. Alternatively, the response 150 can be provided by the entity that that manages the second website 120. The reference 125 can be posted to the first website 110 after the time delay indicated in the response 150 has expired.

In yet another arrangement, the first website 110 can post the reference 125 when the first website 110 receives the response 150 to the alert 140, and the response 150 indicates the second website 120 is prepared to handle the increase in workload. The response 150 can be generated by the response system 145, or the entity tasked with managing the second website 120.

In a further arrangement, the reference 125 can be posted to the second website 120, as accessible to users in a first geographic region, after a first time delay has expired since the alert 140 is communicated to the second website 120 or the entity that manages the second website. In this case, the response system 145 need not generate the alert 150. The reference 125 can be posted to the second website 120, as accessible to users in a second geographic region, after a second time delay has expired since the alert 140 is communicated to the second website 120 or the entity that manages the second website. The reference 125 can be posted to the second website 120, as accessible to users in other geographic regions, after a respective time delays have expired since the alert 140 is communicated to the second website 120 or the entity that manages the second website.

Regardless of how posting of the reference 125 to the first website 110 is delayed, a user who provided the reference to the second website into the first website can be identified, and a notification can be communicated to the user that posting of the reference 125 in the first website 110 will be delayed. Such notification can indicate when the reference 125 will be provided to users in various geographic locations.

In one aspect, responsive to the web server 115/second website 120 receiving the alert 140, a workload management system 155 can be initiated to prepare the second website 120 to handle increased traffic. For example, certain processes executing on the web server 115, certain websites hosted by the web server 115, or a portion of web traffic to the web server 115, can be transferred to another web server. Further, additional resources can be allocated to the web server 115 to aid the web server 115 in handling the increased web traffic. For instance, the web server 115 can be assigned additional processing resources (e.g., processor cores), additional memory (e.g., RAM), additional storage capacity, etc. If the web server 115 is maintained in a cloud computing environment, the additional resources can be dynamically assigned to the web server 115. When the workload management system 155 has suitably configured the web server 115 to handle the increased workload, the workload management system 155 can communicate a corresponding message to the web server 115. In response to such message, the web server 115 can generate the response 150 and communicate the response to the web server 105.

The site analytics 130 and workload notification engine 135 can be processes executed by the web server 105, for example by the first website 110, or processes executed by one or more other systems to which the web server 105 is communicatively linked. Further, the response system 145 and workload management system 155 can be processes executed by the web server 115, for example by the first website 110, or processes executed by one or more other systems to which the web server 115 is communicatively linked.

Figure 2:
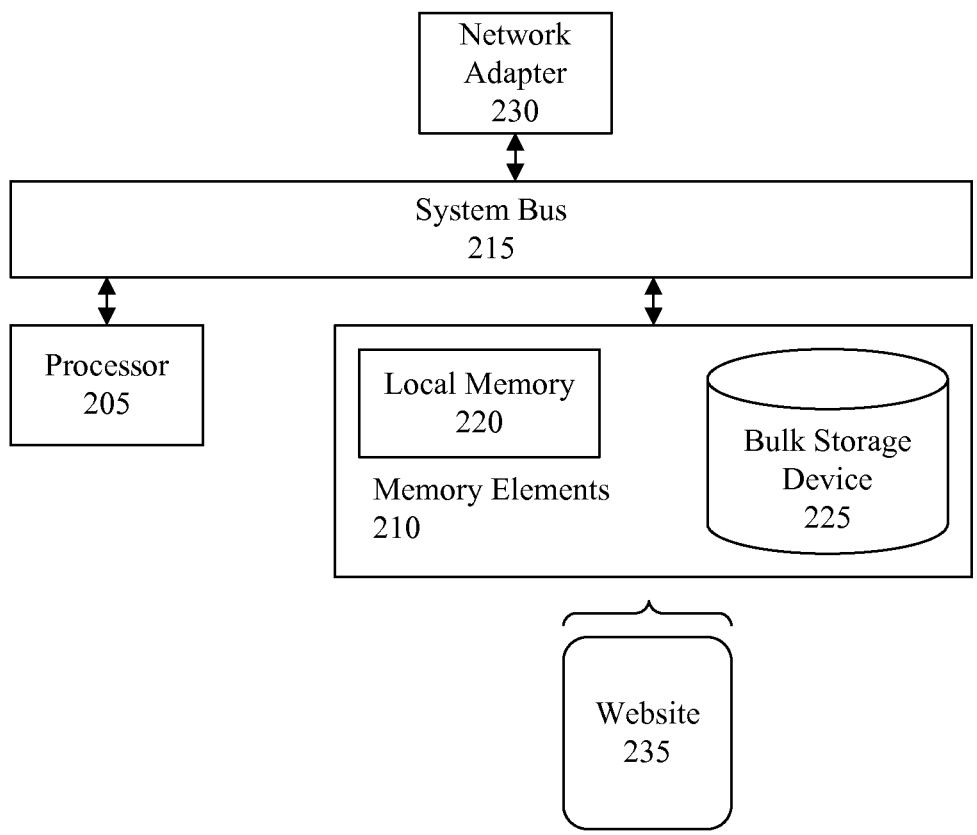
FIG. 2 is a block diagram illustrating a processing system in accordance with one embodiment disclosed within this specification.

FIG. 2 is a block diagram illustrating a processing system 200 in accordance with one embodiment disclosed within this specification. The processing system 200 is an example of a processing system that may be implemented to host the web server 105 and/or to host the web server 115. In this regard, the processing system 200 merely is an example of a processing system for purposes of explanation, and the structure identified therein may be repeated among multiple different processing systems. In illustration, the structure defined therein may be implemented to host the web server 105, and a similar structure, though not the same physical components, may be implemented to host the web server 120.

The processing system 200 can include at least one processor 205 coupled to memory elements 210 through a system bus 215 or other suitable circuitry. As such, the processing system 200 can store program code within the memory elements 210. The processor 205 can execute the program code accessed from the memory elements 210 via the system bus 215. It should be appreciated that the processing system 200 can be implemented in the form of any system including a processor and memory that is capable of performing the functions and/or operations described within this specification. For example, the processing system 200 can be implemented as a computer, a workstation, a mobile computer, a laptop computer, tablet computer, a smart phone, a personal digital assistant, a gaming device, an appliance, and so on.

The memory elements 210 can include one or more physical memory devices such as, for example, local memory 220 and one or more bulk storage devices 225. Local memory 220 refers to RAM or other non-persistent memory device(s) generally used during actual execution of the program code. The bulk storage device(s) 225 can be implemented as a hard disk drive (HDD), solid state drive (SSD), or other persistent data storage device. The processing system 200 also can include one or more cache memories (not shown) that provide temporary storage of at least some program code in order to reduce the number of times program code must be retrieved from the bulk storage device 225 during execution.

One or more network adapters 230 can be coupled to processing system 200 to enable processing system 200 to become coupled to other systems, computer systems, remote printers, and/or remote storage devices through intervening private or public networks. Modems, cable modems, and Ethernet cards are examples of different types of network adapters 230 that can be used with processing system 200. Optionally, input/output (I/O) devices such as a display, a pointing device and a keyboard (not shown) can be coupled to the processing system 200. The I/O devices can be coupled to the processing system 200 either directly or through intervening I/O controllers.

As pictured in FIG. 2, the memory elements 210 can store a program code for a website 235. Being implemented in the form of executable program code, the website 235 can be considered part of the processing system 200.

In an arrangement in which the processing system hosts the web server 105 of FIG. 1, the website 235 can be the first website 110. Further, the memory elements 210 can store a program code for the site analytics 130 and the workload notification engine 135, though this need not be the case as these components may be stored and/or executed by systems to which the processing system 200 is communicatively linked. Nonetheless, being executed at the behest of the processing system 200, such components also can be considered to be components of the processing system 200, or a larger system to which the processing system 200 belongs.

In an arrangement in which the processing system hosts the web server 115 of FIG. 1, the website 235 can be the second website 120. Further, the memory elements 210 can store a program code for the response system 145 and the workload management system 155, though this need not be the case as these components may be stored and/or executed by systems to which the processing system 200 is communicatively linked. Nonetheless, being executed at the behest of the processing system 200, such components also can be considered to be components of the processing system 200, or a larger system to which the processing system 200 belongs.

FIG. 3 is a flow chart illustrating a method 300 of providing advanced notification of workload in accordance with another embodiment disclosed within this specification. At step 302, a reference to a second website provided to a first website for posting by the first website can be identified. At step 304, via a processor, information associated with the first website can be analyzed to determine whether the reference to the second website will cause an increase in workload to the second website. At step 306, responsive to determining the reference to the second website will cause the increase in workload to the second website, an alert can be communicated to the second website or an entity that manages the second website, the alert indicating that the increase in workload to the second website will occur. At step 308, the reference to the second website can be posted in the first website after a particular time delay has expired since the alert is communicated to the second website or the entity that manages the second website.

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of providing advanced notification of workload, the method comprising:
    identifying a reference to a second website provided to a first website for posting by the first website;
    analyzing, via a processor, information associated with the first website to determine whether the reference to the second website will cause an increase in workload to the second website;
    responsive to determining the reference to the second website will cause the increase in workload to the second website, communicating an alert to the second website or an entity that manages the second website, the alert indicating that the increase in workload to the second website will occur;
    posting in the first website the reference to the second website as accessible to users in a first geographic region after a first time delay has expired since the alert is communicated to the second website or the entity that manages the second website; and
    posting in the first website the reference to the second website as accessible to users in a second geographic region after a second time delay has expired since the alert is communicated to the second website or the entity that manages the second website.

2. The method of claim 1, further comprising:
    posting in the first website the reference to the second website after a particular time delay has expired since the alert is communicated to the second website or the entity that manages the second website.

3. The method of claim 2, further comprising:
    identifying a user who provided the reference to the second website into the first website;
    communicating a notification to the user that posting of the reference in the first website will be delayed.

4. The method of claim 2, wherein the time delay is specified by a user who provided the reference to the second website into the first website.

5. The method of claim 1, further comprising:
    receiving from the second website or the entity that manages the second website a response indicating that the second website is prepared to handle the increase in workload; and
    responsive to receiving the response indicating that the second website is prepared to handle the increase in workload, posting in the first website the reference to the second website.

6. The method of claim 1, further comprising:
    receiving from the second website or the entity that manages the second website a response requesting a time delay in posting in the first website the reference to the second website; and
    responsive to receiving the response requesting the time delay in posting in the first website the reference to the second website, posting in the first website the reference to the second website after the time delay has expired.

7. The method of claim 1, further comprising:
    analyzing information associated with the second website to determine whether the reference to the second website will cause an increase in workload to the second website;
    wherein communicating the alert to the second website or that entity that manages the second website further is responsive to determining that the reference to the second website will cause an increase in workload to the second website based, at least in part, on the information associated with the second website.

8. A system comprising:
    a processor and a memory configured to initiate executable operations comprising:
    identifying a reference to a second website provided to a first website for posting by the first website;
    analyzing information associated with the first website to determine whether the reference to the second website will cause an increase in workload to the second website;
    responsive to determining the reference to the second website will cause the increase in workload to the second website, communicating an alert to the second website or an entity that manages the second website, the alert indicating that the increase in workload to the second website will occur;
    posting in the first website the reference to the second website as accessible to users in a first geographic region after a first time delay has expired since the alert is communicated to the second website or the entity that manages the second website; and
    posting in the first website the reference to the second website as accessible to users in a second geographic region after a second time delay has expired since the alert is communicated to the second website or the entity that manages the second website.

9. The system of claim 8, wherein the executable operations further comprise:
    posting in the first website the reference to the second website after a particular time delay has expired since the alert is communicated to the second website or the entity that manages the second website.

10. The system of claim 9, wherein the executable operations further comprise:
    identifying a user who provided the reference to the second website into the first website;
    communicating a notification to the user that posting of the reference in the first website will be delayed.

11. The system of claim 9, wherein the time delay is specified by a user who provided the reference to the second website into the first website.

12. The system of claim 8, wherein the executable operations further comprise:
    receiving from the second website or the entity that manages the second website a response indicating that the second website is prepared to handle the increase in workload; and
    responsive to receiving the response indicating that the second website is prepared to handle the increase in workload, posting in the first website the reference to the second website.

13. The system of claim 8, wherein the executable operations further comprise:
    receiving from the second website or the entity that manages the second website a response requesting a time delay in posting in the first website the reference to the second website; and
    responsive to receiving the response requesting the time delay in posting in the first website the reference to the second website, posting in the first website the reference to the second website after the time delay has expired.

14. The system of claim 8, wherein the executable operations further comprise:

analyzing information associated with the second website to determine whether the reference to the second website will cause an increase in workload to the second website;

wherein communicating the alert to the second website or that entity that manages the second website further is responsive to determining that the reference to the second website will cause an increase in workload to the second website based, at least in part, on the information associated with the second website.

15. A computer program product for providing advanced notification of workload, the computer program product comprising:

a computer-readable storage device having stored thereon program code that, when executed, configures a processor to perform executable operations comprising:

identifying a reference to a second website provided to a first website for posting by the first website;

analyzing information associated with the first website to determine whether the reference to the second website will cause an increase in workload to the second website;

responsive to determining the reference to the second website will cause the increase in workload to the second website, communicating an alert to the second website or an entity that manages the second website, the alert indicating that the increase in workload to the second website will occur;

posting in the first website the reference to the second website as accessible to users in a first geographic region after a first time delay has expired since the alert is communicated to the second website or the entity that manages the second website; and posting in the first website the reference to the second website as accessible to users in a second geographic region after a second time delay has expired since the alert is communicated to the second website or the entity that manages the second website.

16. The computer program product of claim 15, wherein the program code, when executed, further configures the processor to perform executable operations comprising:

posting in the first website the reference to the second website after a particular time delay has expired since the alert is communicated to the second website or the entity that manages the second website.

17. The computer program product of claim 15, wherein the program code, when executed, further configures the processor to perform executable operations comprising:

receiving from the second website or the entity that manages the second website a response indicating that the second website is prepared to handle the increase in workload; and responsive to receiving the response indicating that the second website is prepared to handle the increase in workload, posting in the first website the reference to the second website.

18. The computer program product of claim 15, wherein the program code, when executed, further configures the processor to perform executable operations comprising:

analyzing information associated with the second website to determine whether the reference to the second website will cause an increase in workload to the second website;

wherein communicating the alert to the second website or that entity that manages the second website further is responsive to determining that the reference to the second website will cause an increase in workload to the second website based, at least in part, on the information associated with the second website.

\* \* \* \* \*